US012617542B2

(12) United States Patent
Buehne et al.

(10) Patent No.: US 12,617,542 B2
(45) Date of Patent: May 5, 2026

(54) BATTERY STORAGE SYSTEM FOR AN AIRCRAFT

(71) Applicant: Archer Aviation Inc., San Jose, CA (US)

(72) Inventors: Alan Buehne, Mission Viejo, CA (US); Benjamin Tigner, Laguna Beach, CA (US); Bernard Ahyow, Irvine, CA (US)

(73) Assignee: Archer Aviation Inc., San Jose, CA (US)

( * ) Notice: Subject to any disclaimer, the term of this patent is extended or adjusted under 35 U.S.C. 154(b) by 0 days.

(21) Appl. No.: 18/275,885

(22) PCT Filed: Feb. 4, 2022

(86) PCT No.: PCT/US2022/015208
§ 371 (c)(1),
(2) Date: Aug. 4, 2023

(87) PCT Pub. No.: WO2022/170031
PCT Pub. Date: Aug. 11, 2022

(65) Prior Publication Data
US 2024/0101261 A1 Mar. 28, 2024

(30) Foreign Application Priority Data
Feb. 5, 2021 (WO) .............................. US63/146407

(51) Int. Cl.
*B64D 27/357* (2024.01)
*B60L 50/60* (2019.01)
(Continued)

(52) U.S. Cl.
CPC .............. *B64D 33/08* (2013.01); *B60L 50/60* (2019.02); *B64D 27/31* (2024.01); *B64D 27/34* (2024.01);
(Continued)

(58) Field of Classification Search
CPC .................. B64D 27/357; B64D 29/00; B64D 2045/009; H01M 50/249; H01M 2220/20
See application file for complete search history.

(56) References Cited

U.S. PATENT DOCUMENTS

| | | | | | |
|---|---|---|---|---|---|
| 5,691,073 | A | * | 11/1997 | Vu | ....................... H01M 50/578 429/57 |
| 8,277,965 | B2 | * | 10/2012 | Hermann | ............ H01M 10/653 429/185 |

(Continued)

FOREIGN PATENT DOCUMENTS

KR          101794244 B1     11/2017

*Primary Examiner* — Joshua J Michener
*Assistant Examiner* — Michael B. Kreiner
(74) *Attorney, Agent, or Firm* — Finnegan, Henderson, Farabow, Garrett & Dunner, LLP

(57) ABSTRACT

In accordance with one embodiment of the present invention, an aircraft comprises a battery pack mounted external to the aircraft structure. The batteries are configured to vent directly to the environment during battery thermal runaway. In one embodiment, an aerodynamic fairing provides an aerodynamically efficient surface and weather protection during nominal flight conditions. During battery thermal runaway however, the aerodynamic fairing is configured to expose the battery to the environment.

9 Claims, 8 Drawing Sheets

(51) Int. Cl.

| | |
|---|---|
| *B64D 27/31* | (2024.01) |
| *B64D 27/34* | (2024.01) |
| *B64D 29/00* | (2006.01) |
| *B64D 33/08* | (2006.01) |
| *B64D 45/00* | (2006.01) |
| *H01M 10/625* | (2014.01) |
| *H01M 10/658* | (2014.01) |
| *H01M 50/204* | (2021.01) |
| *H01M 50/249* | (2021.01) |
| *H01M 50/258* | (2021.01) |
| *H01M 50/342* | (2021.01) |

(52) U.S. Cl.
CPC .......... *B64D 27/357* (2024.01); *B64D 29/00* (2013.01); *B64D 45/00* (2013.01); *H01M 10/625* (2015.04); *H01M 10/658* (2015.04); *H01M 50/204* (2021.01); *H01M 50/249* (2021.01); *H01M 50/258* (2021.01); *H01M 50/342* (2021.01); *B60L 2200/10* (2013.01); *B64D 2045/009* (2013.01); *H01M 2200/10* (2013.01); *H01M 2220/20* (2013.01)

(56) References Cited

U.S. PATENT DOCUMENTS

| | | | | |
|---|---|---|---|---|
| 8,967,529 | B1 * | 3/2015 | Bennett | H01M 50/204 |
| | | | | 446/57 |
| 9,001,498 | B2 * | 4/2015 | Bertolotti | F03D 80/00 |
| | | | | 361/601 |
| 9,911,967 | B2 * | 3/2018 | Cohen | B60K 1/04 |
| 11,738,874 | B2 * | 8/2023 | Becker | B64D 27/02 |
| | | | | 244/55 |
| 11,916,251 | B1 * | 2/2024 | Wroblewski | H01M 50/227 |
| 11,946,287 | B2 * | 4/2024 | Aimo Boot | E05F 1/105 |
| 11,949,121 | B2 * | 4/2024 | Skroski | H01M 50/548 |
| 11,990,593 | B2 * | 5/2024 | Delioussine | H01M 50/308 |
| 12,057,562 | B2 * | 8/2024 | Sweet | H01M 10/6569 |
| 2016/0107756 | A1 * | 4/2016 | Liske | B64D 27/357 |
| | | | | 244/54 |
| 2018/0287234 | A1 | 10/2018 | Melack | |
| 2019/0100312 | A1 | 4/2019 | Fen | |
| 2020/0277061 | A1 | 9/2020 | Becker | |
| 2020/0277062 | A1 * | 9/2020 | Becker | B64D 27/24 |
| 2021/0391627 | A1 * | 12/2021 | Villanueva | H01M 50/358 |
| 2024/0186612 | A1 * | 6/2024 | Nikaido | H01M 10/613 |

* cited by examiner

1

BATTERY STORAGE SYSTEM FOR AN AIRCRAFT

PRIORITY CLAIM

This application claims priority to PCT application having serial number PCT/US22/15208 (filed Feb. 4, 2022), which claims priority to U.S. provisional application having Ser. No. 63/146,407 (filed Feb. 5, 2021). These and all other extrinsic material discussed herein are incorporated by reference in their entirety. Where a definition or use of a term in an incorporated reference is inconsistent or contrary to the definition of that term provided herein, the definition of that term provided herein applies and the definition of that term in the reference does not apply.

FIELD OF THE INVENTION

The field of the invention is electric energy storage for aircraft.

BACKGROUND

Lithium batteries can become unstable and enter battery thermal runaway, a condition that can result in fire or explosion. When multiple battery cells are close together, thermal runaway can propagate from one battery cell to the next, a state known as thermal runaway propagation. The condition can be catastrophic if not designed for properly.

Lithium batteries undergoing thermal runaway also emit dangerous high-volume hot gas streams ("outgassing"). Outgassing can contribute to thermal runaway propagation as well as present a hazard for the surroundings, the gas is typically very hot and contaminated with particles.

To address the above concerns, conventional vehicle propulsion battery systems use a containment structure with dedicated vent passages and access passages for manufacturing and maintenance. The containment structure is often surrounded by vehicle structural elements or is incorporated into the vehicle structure itself. However, such containment structures, with dedicated venting passages, can be very heavy and space consuming.

SUMMARY

In accordance with one embodiment of the present invention, an aircraft comprises batteries mounted external to the aircraft structure. The batteries are configured to vent directly to the environment during battery thermal runaway. In one embodiment, an aerodynamic fairing provides streamlined aerodynamics and weather protection. During battery thermal runaway however, the aerodynamic fairing is configured to expose the battery to the environment.

In one embodiment, an aircraft energy storage system comprises a thermal barrier interposed between the battery pack and the outside of the airframe. The thermal barrier shields the airframe from the batteries and can direct any fire or combustion away from the aircraft structure.

2

Figure 4:
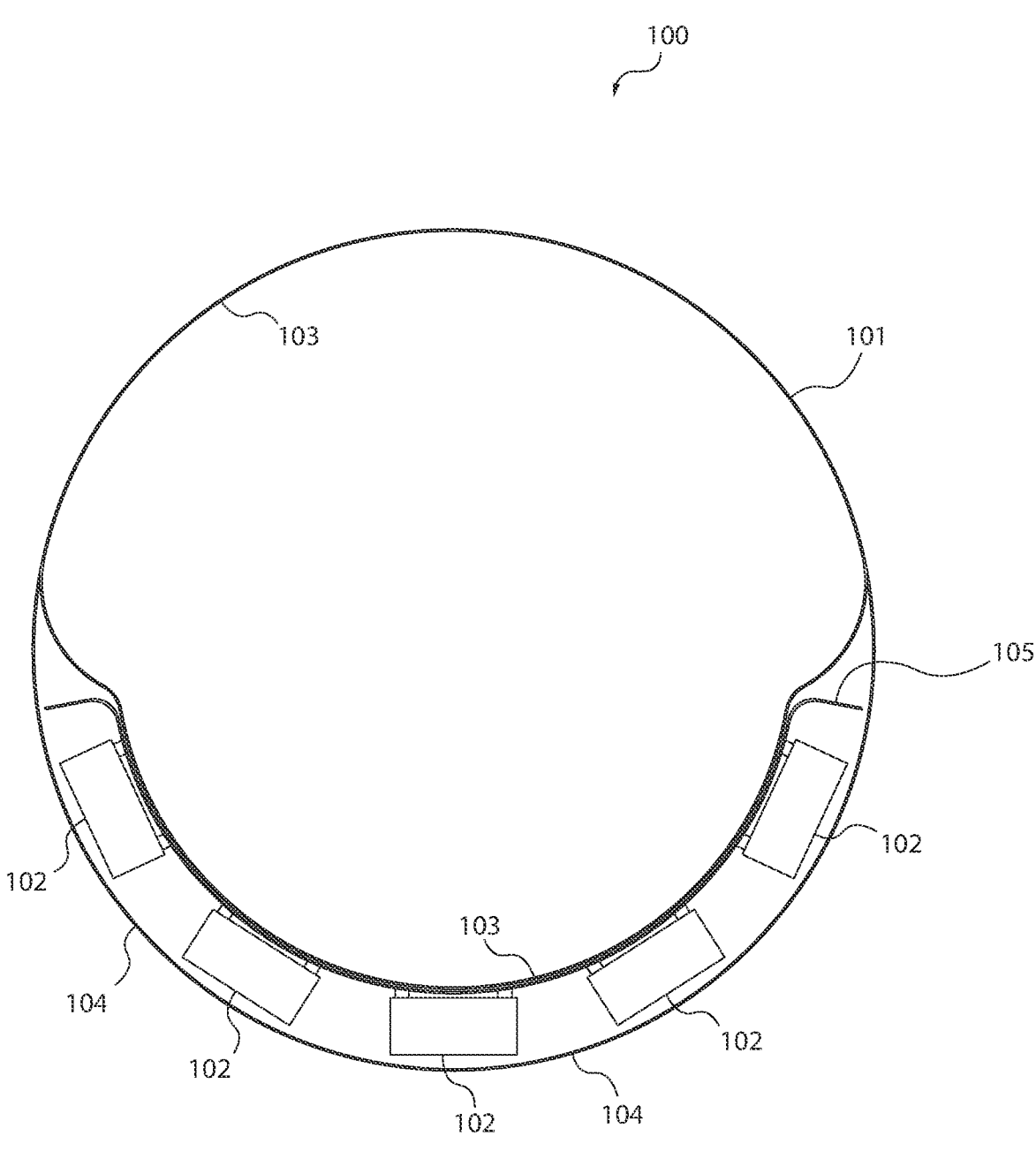

FIG. 4 is a vertical cross section of an embodiment of a battery storage system.

Figure 5:
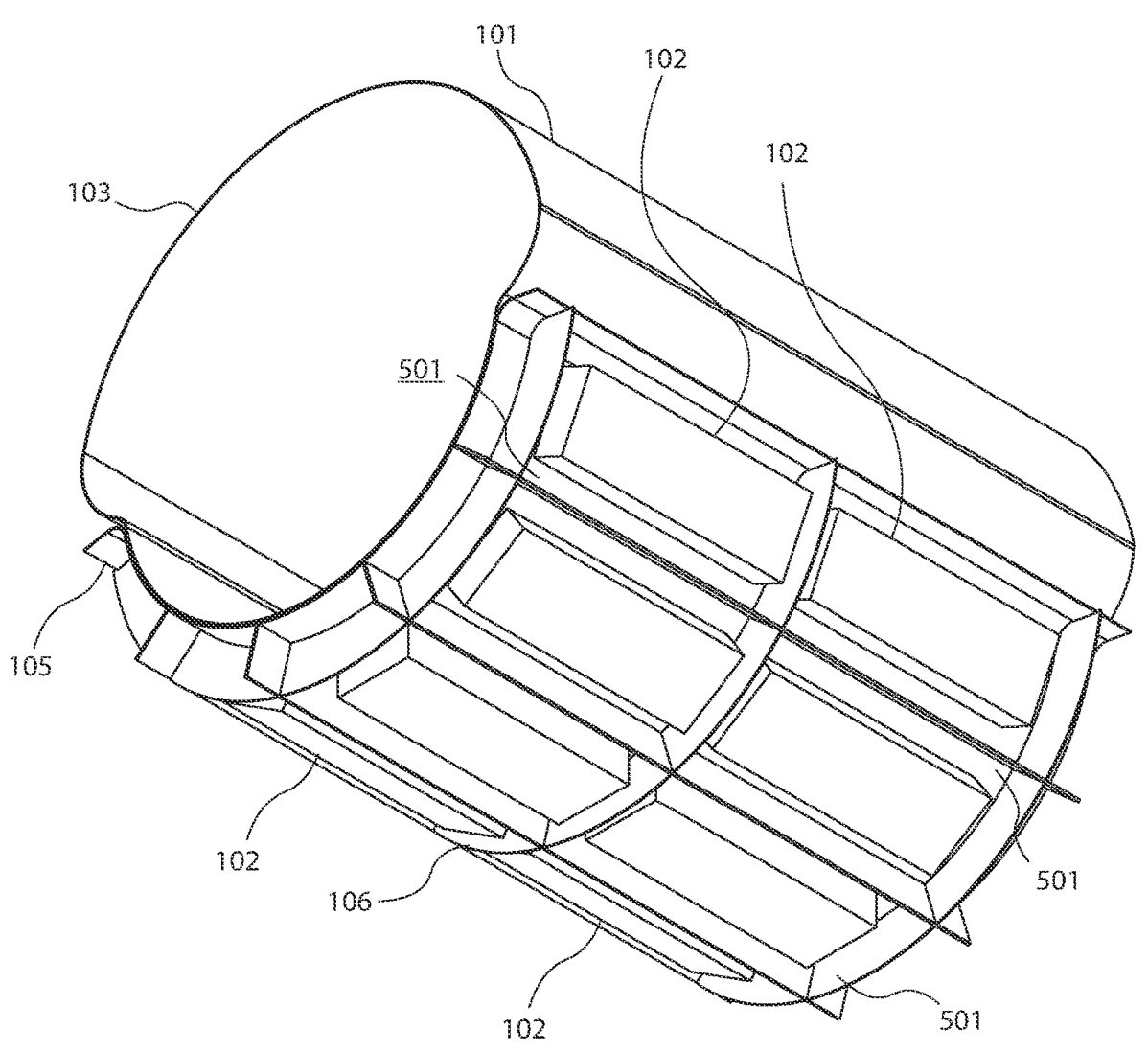

FIG. 5 is a perspective view of a portion of the battery storage system of FIG. 4.

Figure 6:
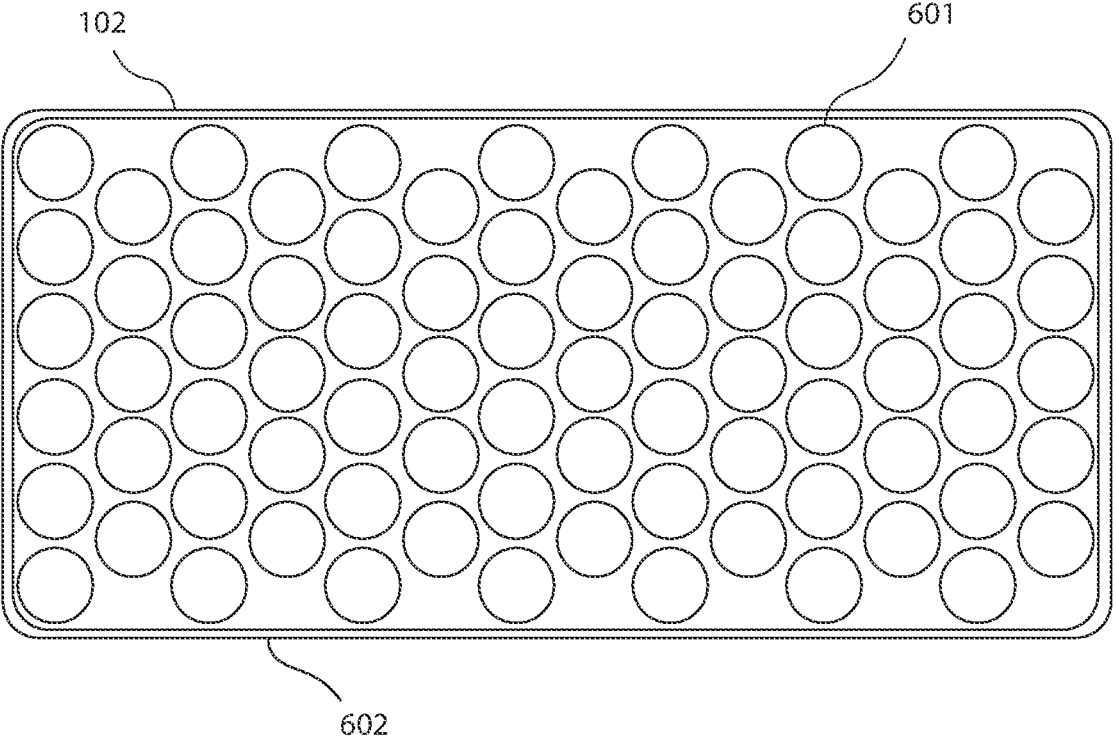

FIG. 6 is a cutaway view of an embodiment of an aircraft battery module comprising battery cells.

Figure 7:
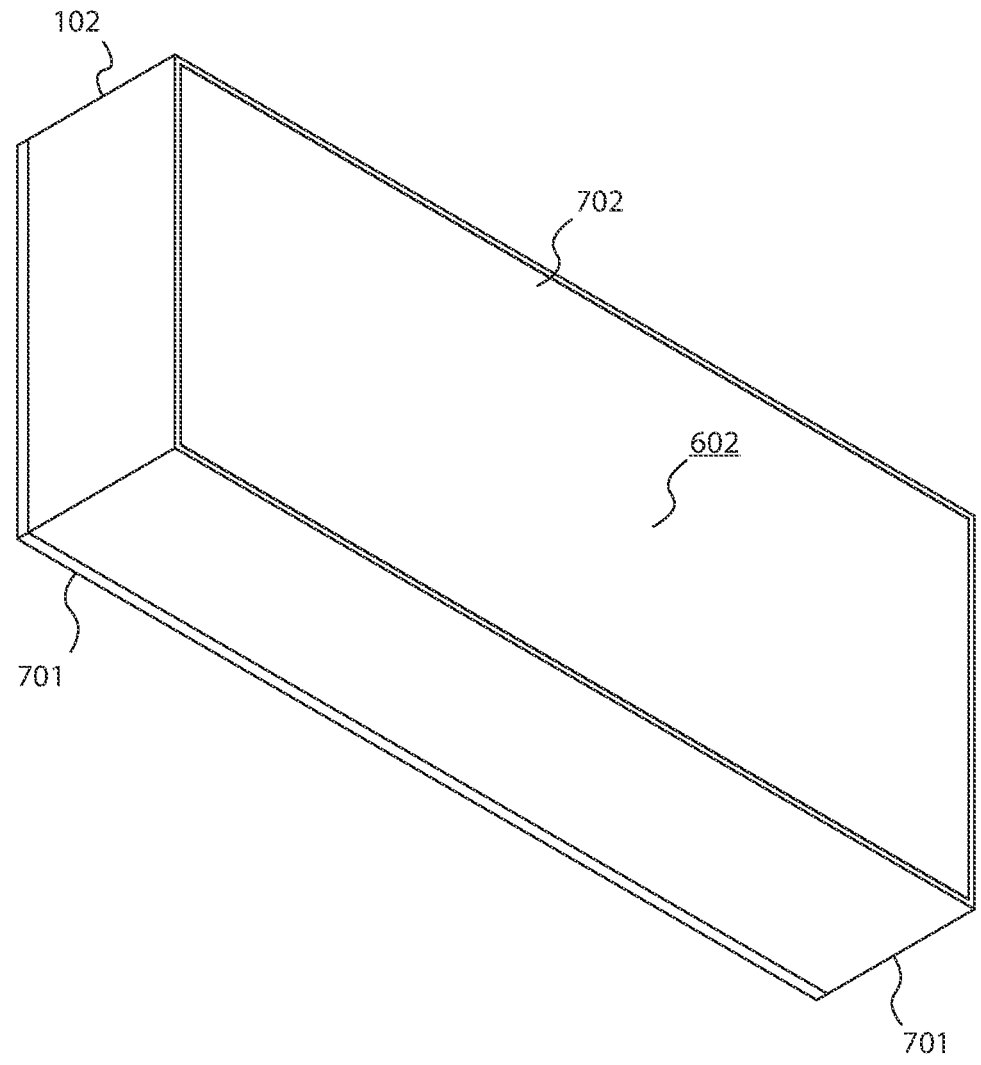

FIG. 7 is a perspective view of an embodiment of an aircraft battery module.

Figure 8:
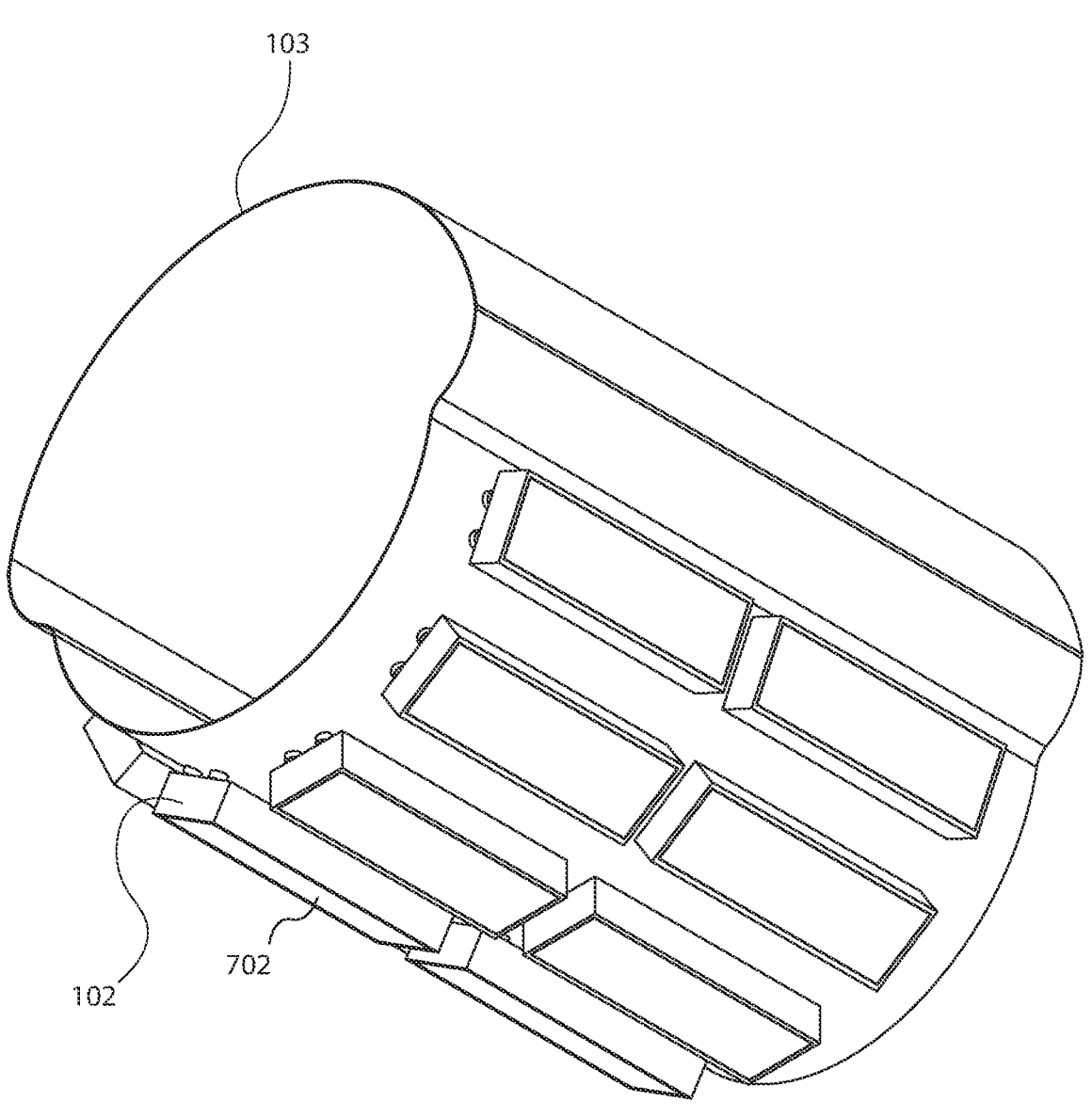

FIG. 8 is a perspective view of a portion of an alternative embodiment of a battery storage system.

DETAILED DESCRIPTION

Figure 1:
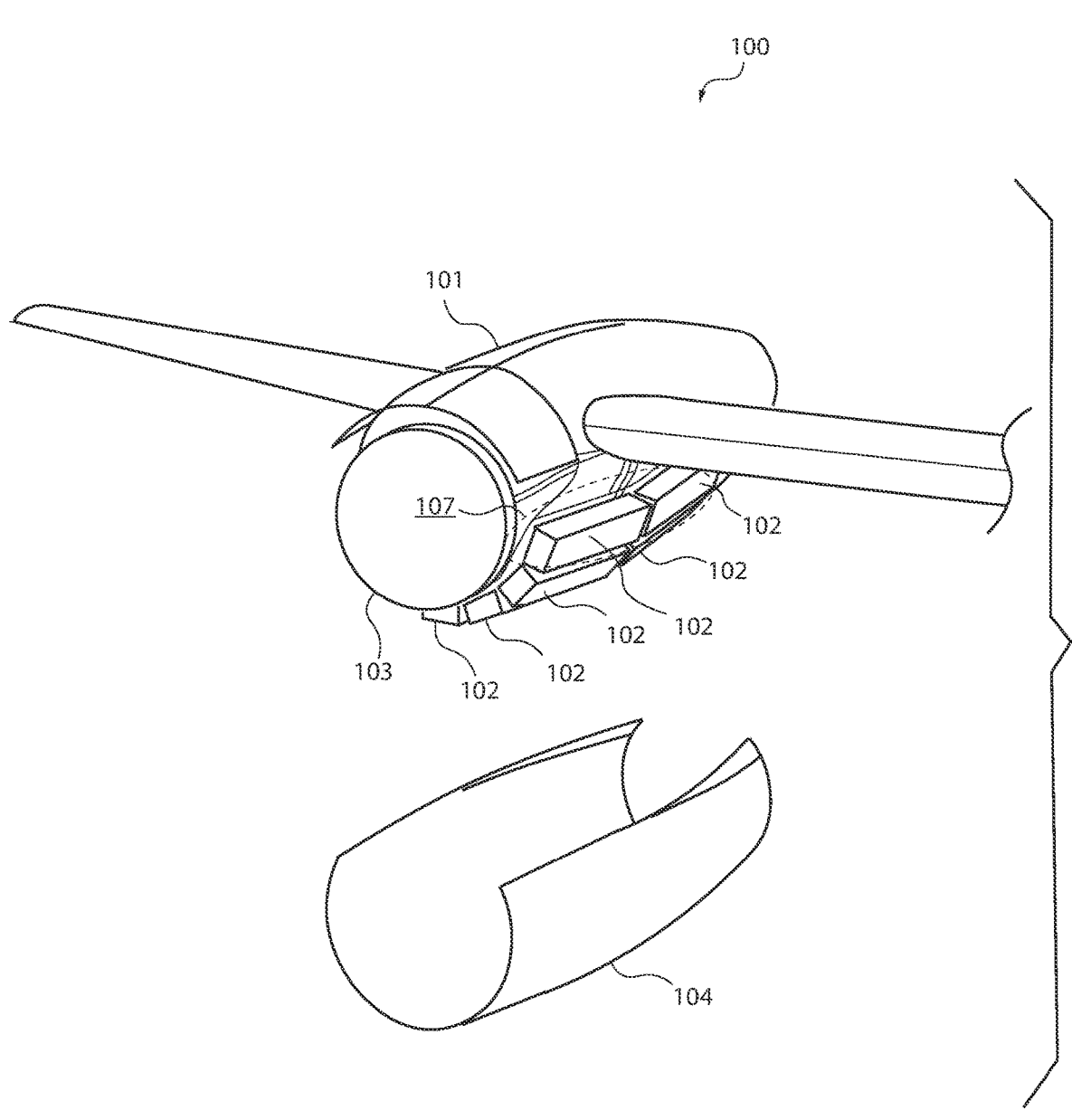
FIG. 1 is a perspective partially exploded view of an embodiment of a battery storage system for an aircraft.

In accordance with the embodiment of FIG. 1, the aircraft comprises a battery pack mounted external to the aircraft structure. The batteries are configured to vent directly to the environment during battery thermal runaway. In the embodiment of FIG. 1, an aerodynamic fairing provides an aerodynamically efficient surface and weather protection during nominal flight conditions. During battery thermal runaway however, the aerodynamic fairing is configured to expose the battery to the environment.

Figure 2:
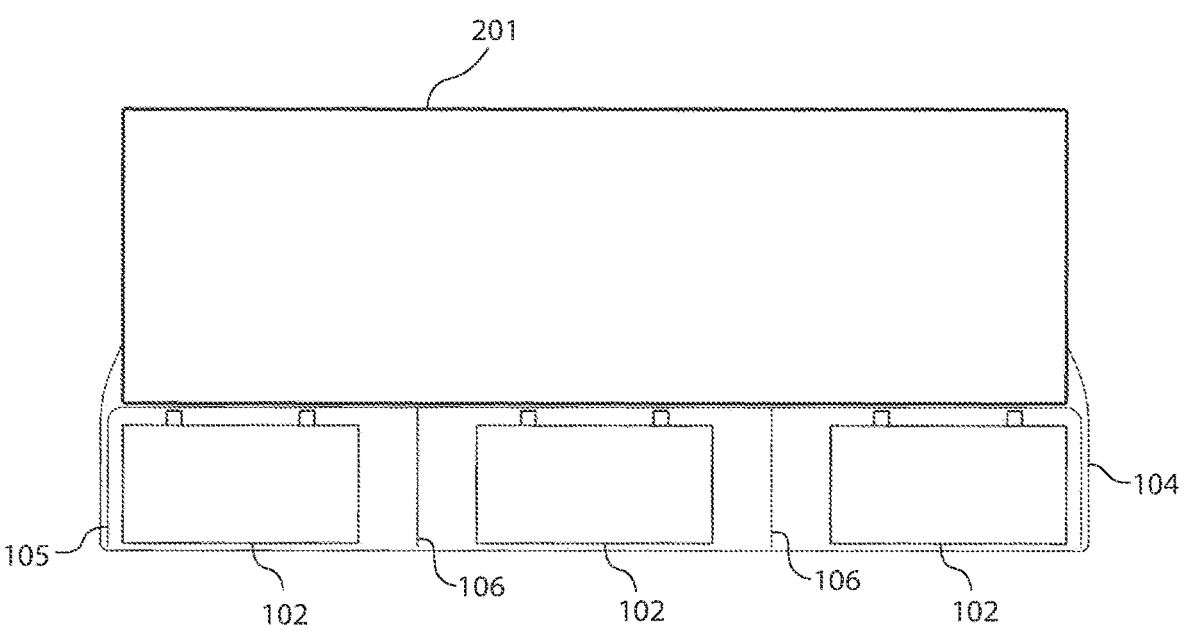
FIG. 2 is a cross-sectional view of an embodiment of a battery storage system.

In the embodiment of FIG. 2, an aircraft energy storage system comprises a thermal barrier that shields the airframe, or components inside of the airframe from the batteries and directs heat and hot gas away from the aircraft airframe. The thermal barrier is interposed between the batteries and the outside of the airframe. The thermal barrier protects the aircraft structure from fire or combustion, while diverting the fire or combustion away from the aircraft structure.

By placing the battery outside of a nacelle, the nacelle can be more rigid and lighter. This is a result of fewer interruptions to the airframe structure. For example, a composite nacelle with the battery housed internal to the nacelle structure would need holes through the composite structure for installing and servicing the battery and related systems. By placing the batteries external to the airframe structure, the need for passages through the airframe structure are minimized. The weight of the resulting structure can be significantly minimized for a desired rigidity.

In one aspect, the subject matter herein describes a battery storage system configured to use airflow to prevent battery thermal propagation. For example, if a first battery module experiences a battery thermal event, the airflow, including airflow from the rotor wake as well as the velocity of the aircraft, can prevent thermal runaway propagation between battery modules. The nacelle, or other aircraft element, may comprise vanes, cowls, vents, or other features configured to use air flow to address thermal propagation.

Figure 3:
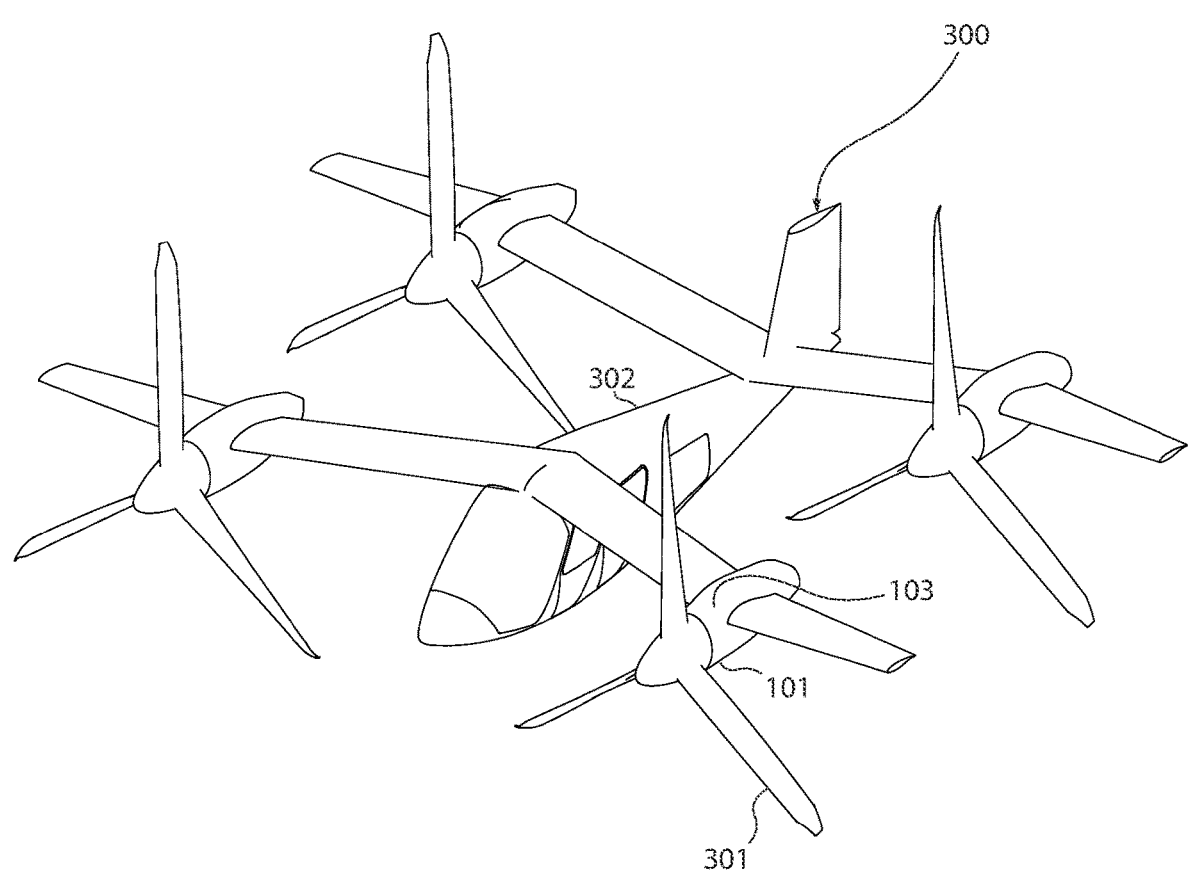
FIG. 3 is a perspective view of an aircraft having a battery storage system as described herein.

FIG. 1 illustrates an embodiment of an aircraft battery storage system 100 comprising a nacelle 101 and battery modules 102. Battery modules 102 are supported by structure 103. Rotor forces are transferred to the fuselage by the structure 103. As illustrated in FIG. 3, structure 103 transfers forces from rotor 301 to fuselage 302.

Returning to FIG. 1, fairing 104 is illustrated in an exploded view position. In nominal flight conditions, fairing 104 may be configured such that when joined with nacelle 101, a streamlined aerodynamic surface is formed. However, the nacelle structure comprises a desired amount of structural strength without the fairing 104. While fairing 104 provides an aerodynamically efficient outer profile, structure 103 is capable of reacting all forces occurring within the nominal flight envelope of the aircraft without fairing 104. That is, in the embodiment of FIG. 1, fairing 104 is a non-structural fairing.

In the embodiment of FIG. 1, structure 103 comprises a dimpled region 107 on either side that accommodates battery modules 102 within an aerodynamically efficient fairing 104. A structure 103 with one or more dimples 107 may address a desire for a structurally efficient nacelle that accommodates a large amount of battery modules 102 interposed between the structure 103 and the fairing 104.

The double dimpled shaped nacelle of the embodiment of FIG. 1 allows for batteries to be mounted external to a mostly continuous nacelle structure while still enabling the outer cover to be smooth and aerodynamically efficient.

A different embodiment, shown in FIG. 2, does not comprise a double dimpled shaped structure 103. Instead, the embodiment of FIG. 2 comprise a fairing 104 that bulges out to accommodate battery modules 102. The embodiment of FIG. 2 comprises thermal barrier 105 and thermal barrier grid dividers 106.

In the embodiment of FIG. 1, fairing 104 is configured to melt or burn in the event of a battery thermal event of one of the batteries 102. Fairing 104 is configured to passively create a vent to the environment in the event of a battery thermal event, directing heat, flames, and other matter away from the other battery modules. Thus, the risk of thermal runaway propagation between the cells is reduced.

FIG. 3 illustrates aircraft 300, including structure 103, nacelle 101, rotor 301, and fuselage 302.

FIG. 4 illustrates a vertical cross-section view of an embodiment of an aircraft battery storage system 100. Nacelle 101 comprises fairing 104, structure 103, batteries 102, and thermal barrier 105.

In the embodiment of FIG. 4, the thermal barrier 105 shields structure 103 from batteries 102. Thermal barrier 105 may comprise: a high temperature microporous ceramic insulation with or without a metal layer, or any other suitable material or combination of suitable materials. In some embodiments, the barrier 105 is configured deter the propagation of matter in addition to heat, while in other embodiments, the barrier 105 may primarily address a desire to deter the propagation of heat, for example, by comprising a high temperature microporous ceramic insulation.

FIG. 5 illustrates a section of the embodiment of FIG. 4. 101. Here, thermal barrier 105 comprises thermal barrier grid dividers 106. Thermal barrier grid dividers 106 address a desire to shield a second battery 102 from a thermal event of a first battery 102.

In the embodiment of FIG. 5, the thermal barrier 105 comprises a barrier extending along five sides of each battery 102. with an opening 501 in a direction away from the structure 103. The barrier may be configured to deter proliferation of matter and/or energy during a battery thermal event or otherwise.

During thermal runaway, pieces of the first battery module 102, as well as any gas and flames, may be inhibited from traveling beyond the five barrier sides. However, an opening 501, which in the embodiment of FIG. 5 is on the sixth side allows ejected pieces, smoke, gas, and flames to be released in the direction of the sixth side. For example, in the embodiment of FIG. 5, barrier 105 defines an opening 501 configured to direct the flow of matter and energy away from structure 103. In the embodiment of FIG. 5, heat, flames, gas, smoke, and battery material are configured to be released out the openings 501 defined by barrier 105 and barrier grid dividers 106, away from the nacelle structure.

In the embodiment of FIG. 5, barrier 105 comprises a first material interposed between the battery modules 102 and the structure 103, and a second material in the regions interposed between adjacent battery modules 102. The first material comprises a material configured to impede a flow of matter and energy, while the second material comprises a material configured to impede a flow of energy. In the embodiment of FIG. 5, the grid dividers 106 comprise a woven ceramic material, while thermal barrier 105 comprises a metallic material and a woven ceramic material. Other embodiments may comprise any desired combination of materials.

FIG. 6 is a cutaway view of an embodiment of a battery module 102. Battery module 102 comprises cells 601 and module wrapper 602. In the embodiment of FIG. 6, module wrapper 602 comprises a thin plastic film. In other embodiments, module wrapper 602 may comprise plastic, metal, rubber, paper, wax, or any suitable material or combination of materials.

In the embodiment of FIG. 7, the battery module 102 comprises an integrated barrier 701 comprising stainless-steel. In the embodiment of FIG. 7, the barrier 701 comprises a five-sided barrier. Each module 102 comprises an integrated barrier that is configured to be removed with the module. The integrated barrier 701 is configured to direct the flow of energy and matter away from the aircraft structure 103 in the event of thermal runaway. In the embodiment of FIG. 7, the integrated barrier 701 extends along five sides of battery module 102. The sixth side of the battery module 102 comprises a significant opening 702. Module wrapper 602 can be seen on the sixth side because of significant opening 702. In the event of a thermal runaway of one or more cells in a first battery module 102, components of the first battery module 102 as well as any gas and flames may be inhibited from traveling in the directions of the five sides along which the thermal barrier extends. However, the sixth side allows matter, smoke and flame to be released in a direction away from the structure 103. For example, in the embodiment of FIG. 8, opening 702 of a first battery module 102 is in an opposing direction of structure 103. While the integrated barrier 701 comprises stainless steel in the embodiment of FIG. 7, other embodiments may comprise any suitable material.

While the battery module embodiment of FIG. 7 comprises a sixth side that is open, other embodiments may comprise a sixth side that is otherwise configured to allow the release of matter and energy, for example by comprising a side that comprises a thinner barrier than the other sides or a material that ruptures earlier in a thermal event than the other sides.

FIG. 8 illustrates aspects of an embodiment of an aircraft battery storage system comprising battery modules 102 wherein the battery modules 102 comprise an integrated barrier. The embodiment of FIG. 8 comprises battery modules 102 that are attached to nacelle structure 103. The integrated barrier may be of any suitable thickness range, for example: 0.002" to 0.005"; 0.005" to 0.010"; 0.015" to 0.020"; 0.040-0.060"; greater than 0.050"; or, any other suitable range. In the embodiment of FIG. 8, the integrated barrier comprises metal but in other embodiments, the integrated barrier may comprise any suitable material.

FIG. 6 illustrates a cutaway view of a battery module 102 comprising multiple cylindrical cells 601. In other embodiments, the modules 102 may comprise any number of cells, even a single cell. Furthermore, embodiments may comprise any suitable type of cells including: cylindrical cells; pouch cells; or, prismatic cells.

Other embodiments comprise an aircraft structure, other than a nacelle, and at least one battery module wherein the at least one battery module is disposed outside the airframe structure. The airframe structure may comprise an outboard wing section, an inboard wing section, a fuselage, or any other aircraft structure. Embodiments comprising a wing section may comprise a structural wing shell, outside of which, the batteries are attached. Such an embodiment may comprise a thermal barrier interposed between the batteries and the outer airframe structure.

Some embodiments described herein comprise multiple battery modules. However, other embodiments, not shown herein, may comprise a single battery module.

One embodiment of an aircraft battery system comprises battery packs that supply a nominal 400 volts; however, any other voltages may be used for example 600 volts or 800 volts. A battery pack may comprise one or more battery modules. In one embodiment, the aircraft comprises a total nominal battery energy capacity in the range of 100 kilowatt hours to 200 kilowatt hours, however, any other suitable battery capacity may be used, for example 250 kilowatt hours.

Some embodiments comprise battery modules wherein the aircraft airframe provides structural support to the battery module. In one embodiment the battery module comprises just enough structure such that the battery may be handled, but not enough structure to withstand flight stresses imposed by flight conditions without being installed into the aircraft. However, the aircraft structure and battery are configured such that once the battery is installed in the aircraft, the battery can withstand desired loads.

In the embodiment of FIG. 1, structure 103 comprises a hollow structure in the region where the battery modules 102 are attached. The battery modules are on the outside of the hollow structure. However, in other embodiments the structure may be other than hollow. For example, structure 103 could be filled with foam in some embodiments.

In one embodiment, aircraft 300 comprises a net or mesh disposed between the battery module and the outside environment. During a thermal event, the net or mesh is configured to contain matter. In other embodiments, the net or mesh is configured to contain matter over a desired size.

The batteries may be of any suitable type including Lithium-ion, lead acid, nickel-metal hydride, ultracapacitor, aluminum-air battery, or any other suitable type. Furthermore, in some embodiments the battery modules could be replaced by fuel cell modules.

In some embodiments, fairing 104 is configured to expose the battery to the environment by burning off in the event of a battery thermal runaway event.

In some embodiments, fairing 104 is configured to expose the battery to the environment in the event of a battery thermal runaway event by melting off in the event of a battery thermal runaway event. For example, fairing 104 can comprise acrylic or nylon.

In some embodiments, fairing 104 is configured to expose the battery to the environment in the event of a battery thermal runaway event by blowing off in the event of a battery thermal runaway event.

In some embodiments, thermal barrier 105 comprises a metal sheet configured to shield the airframe structure from a battery thermal runaway event. In some embodiments, thermal barrier 105 may comprise: steel, stainless steel, titanium, or any other suitable material.

In some embodiments of a battery storage system, the battery comprises a propulsion battery.

Some of the embodiments disclosed herein of a battery storage system for an aircraft are particularly well suited for passenger carrying aircraft. Passenger carrying aircraft require high degrees of safety. Furthermore, embodiments comprising nacelle located batteries can be especially well suited for passenger carrying aircraft because the batteries and any related hazards are kept away from passengers. Thus, the airframe is protected as described above and the passengers are kept away from danger.

Some embodiments of a battery storage system for an aircraft are particularly well suited for aircraft configured to carry at least 500 pounds. Aircraft configured to carry over 500 pounds typically require complex airframe geometry to support the aircraft loads. Embodiments described herein allow for use of strong structural geometries while also providing safe and light weight battery storage.

The invention claimed is:

1. An aircraft comprising a nacelle coupled to a structural airframe, the aircraft comprising;
   a first propulsion battery module mounted between a body of the nacelle and a non-structural fairing of the nacelle, wherein the first propulsion battery module is mounted outside the body of the nacelle;
   a first thermal barrier interposed between the body of the nacelle and the first propulsion battery module, wherein the first thermal barrier also laterally envelops the first propulsion battery module; and
   an opening in the first thermal barrier on a side opposite the body of the nacelle, the opening configured to vent gas away from the body and toward the non-structural fairing during a thermal runaway event of the first propulsion battery.

2. The aircraft of claim 1 wherein the non-structural fairing comprises a material that melts during the battery thermal event.

3. The aircraft of claim 1 wherein the first propulsion battery module is integrated with the first thermal barrier.

4. The aircraft of claim 1 further comprising a second thermal barrier interposed between the body of the nacelle and a second propulsion battery module different from the first propulsion battery module.

5. The aircraft of claim 1, further comprising a second propulsion battery module mounted between the body of the nacelle and the non-structural fairing of the nacelle, and a second thermal barrier divider interposed between the first and second propulsion battery modules.

6. The aircraft of claim 1, wherein the structural airframe comprises a hollow structure.

7. The aircraft of claim 6, additionally comprising at least a second propulsion battery module, wherein the first and second propulsion battery modules are disposed external to the hollow structure.

8. An aircraft for shielding from a propulsion battery thermal runaway event, the aircraft comprising:
   an airframe structure;
   at least first and second propulsion battery modules disposed on an outside of the airframe structure;
   a first thermal barrier configured between the (a) first and second propulsion battery modules and (b) the outside of the airframe structure; and
   a second thermal barrier configured between the first and second propulsion battery modules, wherein the second thermal barrier laterally envelops each of the first and second propulsion battery modules,
   wherein the second thermal barrier is configured to vent gas from at least one of the first and second propulsion battery modules, directly to the outside during the propulsion battery thermal runaway event.

9. The aircraft of claim 8, wherein at least a portion of the first propulsion battery module is positioned toward a non-structural fairing during aircraft flight.

\* \* \* \* \*